US008134992B1

(12) United States Patent
Nam et al.

(10) Patent No.: US 8,134,992 B1
(45) Date of Patent: Mar. 13, 2012

(54) MESSAGE-BASED COEXISTENCE INTERFACE BETWEEN WIRELESS DEVICES

(75) Inventors: Kyungwan Nam, Santa Clara, CA (US); James S. Cho, Mountain View, CA (US); Joakim Linde, Palo Alto, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 741 days.

(21) Appl. No.: 12/236,604

(22) Filed: Sep. 24, 2008

(51) Int. Cl.
*H04J 3/00* (2006.01)

(52) U.S. Cl. .................................. 370/345; 370/338

(58) Field of Classification Search .................. 370/345, 370/229, 230, 338, 341, 347, 277, 278, 280, 370/282, 294, 310, 339, 349, 352, 389, 466, 370/468, 498, 478, 344, 328, 337, 465; 455/78, 455/83
See application file for complete search history.

(56) References Cited

U.S. PATENT DOCUMENTS

| | | | |
|---|---|---|---|
| 7,046,649 B2 | 5/2006 | Awater et al. | |
| 7,460,543 B2 | 12/2008 | Malik et al. | |
| 7,568,034 B1 | 7/2009 | Dulitz et al. | |
| 7,814,224 B2 | 10/2010 | Maruyama et al. | |
| 2004/0156367 A1 | 8/2004 | Albuquerque et al. | |
| 2005/0185651 A1 | 8/2005 | Rinne | |
| 2006/0030266 A1* | 2/2006 | Desai et al. | 455/41.2 |
| 2006/0221825 A1 | 10/2006 | Okano | |
| 2006/0292986 A1* | 12/2006 | Bitran et al. | 455/41.2 |
| 2007/0021066 A1* | 1/2007 | Dravida et al. | 455/41.2 |
| 2007/0135162 A1 | 6/2007 | Banerjea et al. | |
| 2007/0165754 A1* | 7/2007 | Kiukkonen et al. | 375/346 |
| 2008/0095124 A1 | 4/2008 | Ramos et al. | |
| 2008/0102885 A1* | 5/2008 | Tu et al. | 455/553.1 |
| 2008/0123682 A1 | 5/2008 | Yackoski et al. | |
| 2008/0130603 A1* | 6/2008 | Wentink et al. | 370/338 |
| 2008/0240139 A1 | 10/2008 | Kodialam et al. | |
| 2008/0259846 A1* | 10/2008 | Gonikberg et al. | 370/328 |
| 2009/0010152 A1 | 1/2009 | Ofek et al. | |
| 2009/0137206 A1* | 5/2009 | Sherman et al. | 455/41.2 |
| 2009/0247217 A1* | 10/2009 | Hsu et al. | 455/553.1 |
| 2009/0298522 A1 | 12/2009 | Chaudhri et al. | |
| 2010/0284380 A1* | 11/2010 | Banerjee et al. | 370/338 |
| 2011/0268024 A1 | 11/2011 | Jamp et al. | |

OTHER PUBLICATIONS

"CSR Bluetooth and IEEE 802.11b Co-Existence Solution", *CSR BlueCore 2-External* Feb. 2003.
"CSR Co-Existence Scheme Definition", *BlueCore 3-External* Nov. 2003.
"How 802.11b/g WLAN and Bluetooth Can Play", *Philips* Sep. 2005.

(Continued)

*Primary Examiner* — Gary Mui
(74) *Attorney, Agent, or Firm* — DeLizio Gilliam, PLLC (57) ABSTRACT

A coexistence mechanism for arbitrating between performing operations associated with a first network device and performing operations associated with a second network device coupled to the first network device. The start time of a scheduled operation associated with a second network device is determined based, at least in part, on an activity report message received at a first network device from the second network device. A scheduled operation associated with the first network device is performed if the scheduled operation associated with the first network device can be performed prior to the start time of the scheduled operation associated with the second network device. Otherwise, the priority of the scheduled operation associated with the first network device is compared to the priority of the scheduled operation associated with the second network device to determine whether to grant control of the transmission channel to the first or second network device.

28 Claims, 7 Drawing Sheets

OTHER PUBLICATIONS

"Three Wire Interface", *Infineon Technologies* Functional Design Document Oct. 4, 2004.
"Wi-Fi and Bluetooth—Interference Issues", *HP* Jan. 2002.
Bluetooth, , "Bluetooth Core Specification Version 3.0", vol. 2, *part B: Core System Package* [*Controller volume*] http://www.bluetooth.com/Bluetooth/Technology/Building/Specifications/(Obtained from the Internet Nov. 4, 2009) Apr. 21, 2009 , pp. 59-206.
U.S. Appl. No. 12/846,427, filed Jul. 29, 2010, Jamp, Joe I.
U.S. Appl. No. 12/620,270, filed Nov. 17, 2009, Hirsch, Olaf et al.
U.S. Appl. No. 12/633,150, filed Dec. 8, 2009, Luthra, Manev.
U.S. Appl. No. 12/639,207, filed Dec. 16, 2009, Luthra, Manev.
U.S. Appl. No. 12/651,871, filed Jan. 4, 2010, Husted, Paul J.
"U.S. Appl. No. 12/620,270 Office Action", Dec. 8, 2011 , 8 pages.
"PCT Application No. PCT/US11/45888 International Search Report", Dec. 13, 2011, 7 pages.

* cited by examiner

MESSAGE-BASED COEXISTENCE INTERFACE BETWEEN WIRELESS DEVICES

BACKGROUND

Embodiments of the inventive subject matter generally relate to the field of wireless communication systems, and, more particularly, to a coexistence interface between wireless local area network (WLAN) and Bluetooth® devices.

In wireless networks, WLAN and Bluetooth devices that are not located at close proximities from one another can avoid interference by various techniques. For example, a Bluetooth® device can implement Adaptive Frequency Hopping (AFH) to avoid frequencies within an operating frequency band associated with a WLAN device. In cases where the WLAN and Bluetooth® devices are located at close proximities from one another, or even co-located within the same wireless device or circuit board, alternative coexistence techniques are typically implemented to avoid interference between transmissions of the WLAN and Bluetooth® devices. For example, collaborative coexistence techniques may be implemented where the WLAN and Bluetooth® devices exchange information to avoid transmitting data at the same time.

SUMMARY

Various embodiments are disclosed of a method for arbitrating between performing operations associated with a first network device and performing operations associated with a second network device coupled to the first network device. In one embodiment, a start time of a scheduled operation associated with a second network device is determined based, at least in part, on an activity report message received at a first network device from the second network device. It is determined whether a scheduled operation associated with the first network device can be performed prior to the start time of the scheduled operation associated with the second network device based, at least in part, on a transaction time associated with the scheduled operation associated with the first network device. The scheduled operation associated with the first network device is performed if the scheduled operation associated with the first network device can be performed prior to the start time of the scheduled operation associated with the second network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to a coexistence interface for WLAN and Bluetooth® devices, in other embodiments the coexistence interface may be implemented for other wireless standards, e.g., WiMAX based on the IEEE 802.16 standard. In other instances, well-known instruction instances, protocols, structures and techniques have not been shown in detail in order not to obfuscate the description.

In various embodiments, a coexistence interface mechanism for WLAN and Bluetooth® devices utilizes the periodicity of some Bluetooth® data traffic to arbitrate between performing WLAN data transmission operations and Bluetooth® data transmission operations. In one example, a Bluetooth® device sends an activity report message to a WLAN device including timing information (e.g., start time and duration) associated with a scheduled Bluetooth® operation. The activity report message also comprises priority information associated with the scheduled Bluetooth® operation. Based on this timing and priority information, the coexistence interface mechanism implements an arbitration process to determine whether the WLAN device or the Bluetooth® device is granted control of the transmission channel for performing a scheduled operation. The coexistence interface mechanism may improve coexistence between WLAN and Bluetooth® devices that are located at close proximities to one another by arbitrating between performing WLAN data transmission operations and Bluetooth® data transmission operations. Furthermore, the coexistence interface mechanism may improve system performance by offloading coexistence processing from application processors and may save power by delaying performance of lower priority operations that would typically be interrupted by higher priority operations. In some embodiments, coexistence between WLAN and Bluetooth® devices may also be improved by sending Quality of Service (QoS) allocation report messages between the devices and/or sending frequency report messages from the WLAN device to the Bluetooth® device, as will be further described below.

Figure 1:
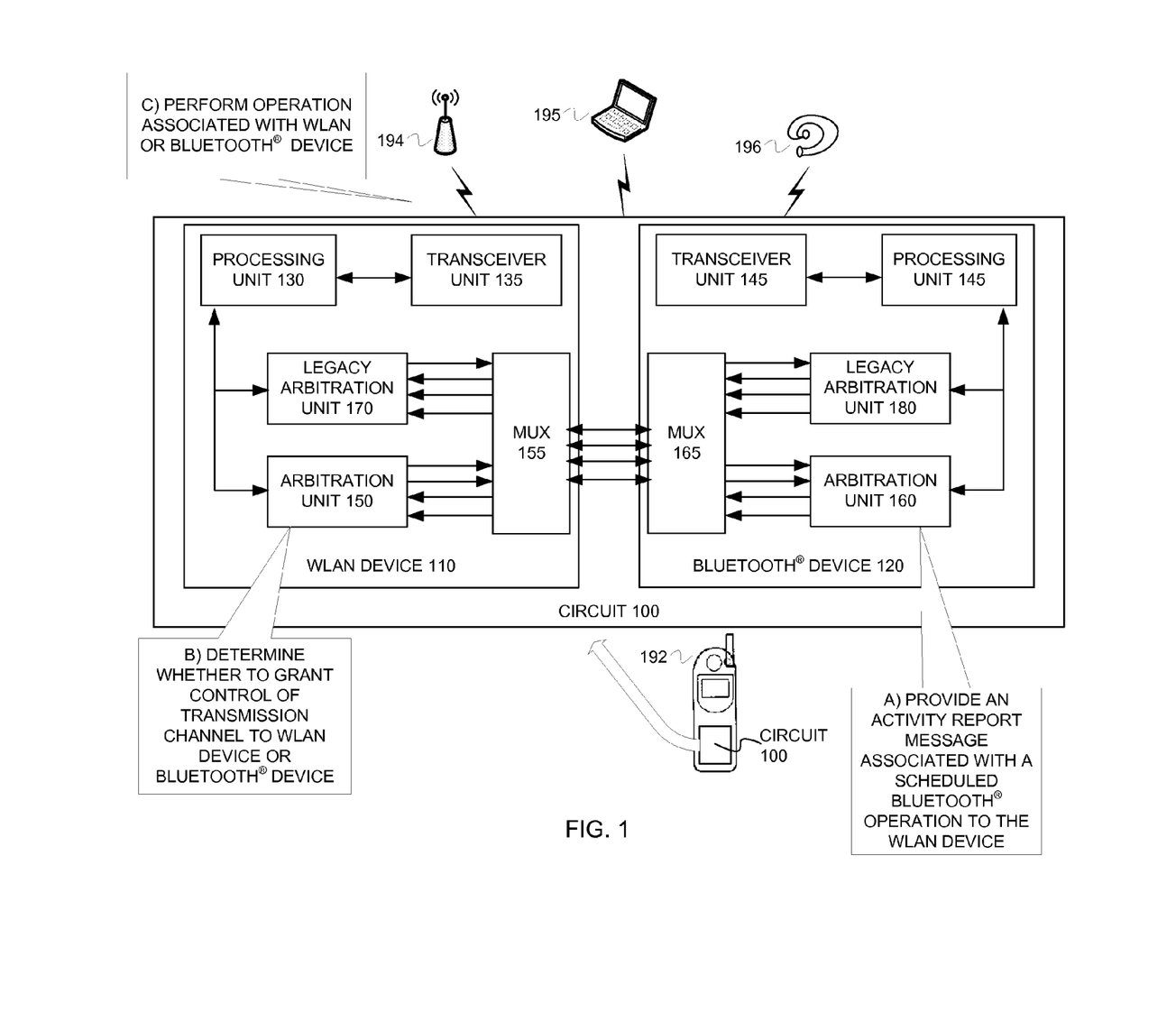
FIG. 1 depicts a conceptual diagram of one embodiment of a system for implementing a message-based coexistence mechanism between a WLAN device and a Bluetooth® device.

FIG. 1 depicts a conceptual diagram of one embodiment of a system for implementing a message-based coexistence mechanism between a WLAN device 110 and a Bluetooth® device 120. As illustrated, in one implementation, the WLAN device 110 and the Bluetooth® device 120 may be located on the same circuit 100, e.g., a circuit board, system-on-a-chip, etc. The circuit 100 may be included within an electronic device, e.g., a mobile phone 192. It is noted, however, that in other embodiments the WLAN device 110 and the Bluetooth® device 120 may be located on different circuits, e.g., on separate circuit boards within a computer system. It is further noted that the circuit 100 may be included within various types of electronic devices, such as personal computers, laptops, and portable media devices. The WLAN device 110 and the Bluetooth® device 120 can perform WLAN and Bluetooth® data transmission operations, respectively, to communicate with one or more electronic devices via a wireless network. For example, the WLAN device 110 may send data to and receive data from an access point 194 and a laptop 195, and the Bluetooth® device 120 may send data to and receive data from the laptop 195 and the Bluetooth® headset 196. In various embodiments, a data traffic arbitration mechanism may be implemented in the WLAN device 110 and the Bluetooth® device 120 for determining whether to grant control of the transmission channel to the WLAN device 110 or the Bluetooth® device 120 to achieve coexistence between the devices, as will be further described below.

In one embodiment, the WLAN device 110 and the Bluetooth device 120 may utilize separate antennas. In this embodiment, the data traffic arbitration mechanism granting control of the transmission channel may comprise enabling the antenna (and/or corresponding transceiver circuitry) associated with one of the devices (e.g., the WLAN device 110 to allow the device to perform data transmission operations, and disabling the antenna (and/or corresponding transceiver circuitry) associated with the other device (e.g., the Bluetooth® device 120). In another embodiment, the WLAN device 110 and the Bluetooth® device 120 may share a single antenna. In this embodiment, the data traffic arbitration mechanism granting control of the transmission channel may comprise granting access to the shared antenna to one of the devices (e.g., the WLAN device 110 to allow the device to perform data transmission operations, and denying access to the shared antenna to the other device (e.g., the Bluetooth® device 120).

As illustrated, in one specific implementation, the WLAN device 110 includes a processing unit 130, a transceiver unit 135, an arbitration unit 150, a legacy arbitration unit 170, and a multiplexer 155. The Bluetooth® device 120 includes a processing unit 140, a transceiver unit 145, an arbitration unit 160, a legacy arbitration unit 180, and a multiplexer 165. The WLAN device 110 may operate according to the IEEE 802.11 specification and one or more of the corresponding IEEE 802.1x amendments, e.g., the IEEE 802.11b/g/n amendments. The Bluetooth® device 120 may operate in accordance with one or more specifications, such as those set forth by the Bluetooth Special Interest Group.

The arbitration unit 150 of the WLAN device 110 is coupled to the arbitration unit 160 of the Bluetooth® device 120 via a plurality of input/output (I/O) lines. For example, the arbitration unit 150 is coupled to the arbitration unit 160 via four I/O lines. In one specific example, the arbitration unit 150 may provide a data signal and a clock signal to the arbitration unit 160 via two I/O lines, and may receive a data signal and a clock signal from the arbitration unit 160 via two additional I/O lines. To implement the coexistence technique, the WLAN device 110 and the Bluetooth® device 120 may send control and informational messages via the data I/O lines. For example, the devices may send 64-bit packets having a message and other information, such as packet integrity check bits (e.g., CRC-16). It is noted, however, that the number of I/O lines between the arbitration unit 150 and the arbitration unit 160 may vary from one implementation to another. It is further noted that in other embodiments the WLAN and Bluetooth® devices may communication by other means, e.g., 32-bit packets, or by both packetized data and level signals.

During operation, as shown at stage A, the arbitration unit 160 of the Bluetooth® device 120 provides an activity report message to the arbitration unit 150 of the WLAN device 110. The activity report message includes a start time, duration, and priority of a scheduled operation associated with the Bluetooth® device 120. At stage B, the arbitration unit 150 performs arbitration functions to determine whether to grant control of the transmission channel to the WLAN device or the Bluetooth® device, as will be described further below with reference to FIGS. 2-3B. Both the arbitration unit 150 and 160 may be implemented in software and/or hardware. For example, the arbitration units may comprise a plurality of state machines to perform the arbitration functions described below.

Based on the arbitration results, for transmit operations, either the processing unit 130 of the WLAN device 110 or the processing unit 140 of the Bluetooth® device 120 processes data associated with a scheduled data transmission operation. For example, the processing unit may load the transmission data from memory and may convert the data from digital to analog form. In other implementations, the data associated with the scheduled data transmission operation has already been processed and is ready for transmission. At stage C, either the transceiver unit 135 or the transceiver unit 145 performs the corresponding scheduled data transmission operation associated with the WLAN device 110 or the Bluetooth® device 120, respectively. For example, the transceiver unit may filter and amplify the analog signal, and may transmit the signal via an antenna. In another example, the transceiver unit may receive an analog signal associated with the scheduled data transmission operation. For the WLAN device 110, the data transmission operation may be various types of WLAN transmissions, for example, traffic related to link stability, such as beacon transmissions, and for the Bluetooth® device 120, the data transmission operation may be various types of Bluetooth® transmissions, for example, synchronous connection-oriented (SCO) traffic and extended SCO (eSCO) traffic.

As illustrated, in one implementation, the WLAN device 110 includes the multiplexer 155 for switching between the arbitration unit 150 and the legacy arbitration unit 170. The Bluetooth® device 120 includes the multiplexer 165 for switching between the arbitration unit 160 and the legacy arbitration unit 180. In this implementation, the option to switch to the legacy arbitration units may help ensure compatibility with other industry coexistence techniques. It is noted, however, that in other embodiments the WLAN device 110 and the Bluetooth® device 120 may not include the legacy arbitration units 170 and 180 and the multiplexers 155 and 165.

It should be noted that the components described with reference to FIG. 1 are meant to be exemplary only, and are not intended to limit the inventive subject matter to any specific set of components or configurations. For example, in various embodiments, one or more of the components described may be omitted, combined, modified, or additional components included, as desired. For instance, in some embodiments the WLAN device 110 and the Bluetooth® device 120 may each be circuits within a system-on-a-chip (SoC), and may share a single antenna and/or may share at least some of the transceiver circuitry in the analog front end (AFE). In other embodiments, the coexistence techniques described herein may be implemented within other types of wireless devices, e.g., WiMAX, ZigBee®, and Wireless USB devices.

Figure 2:
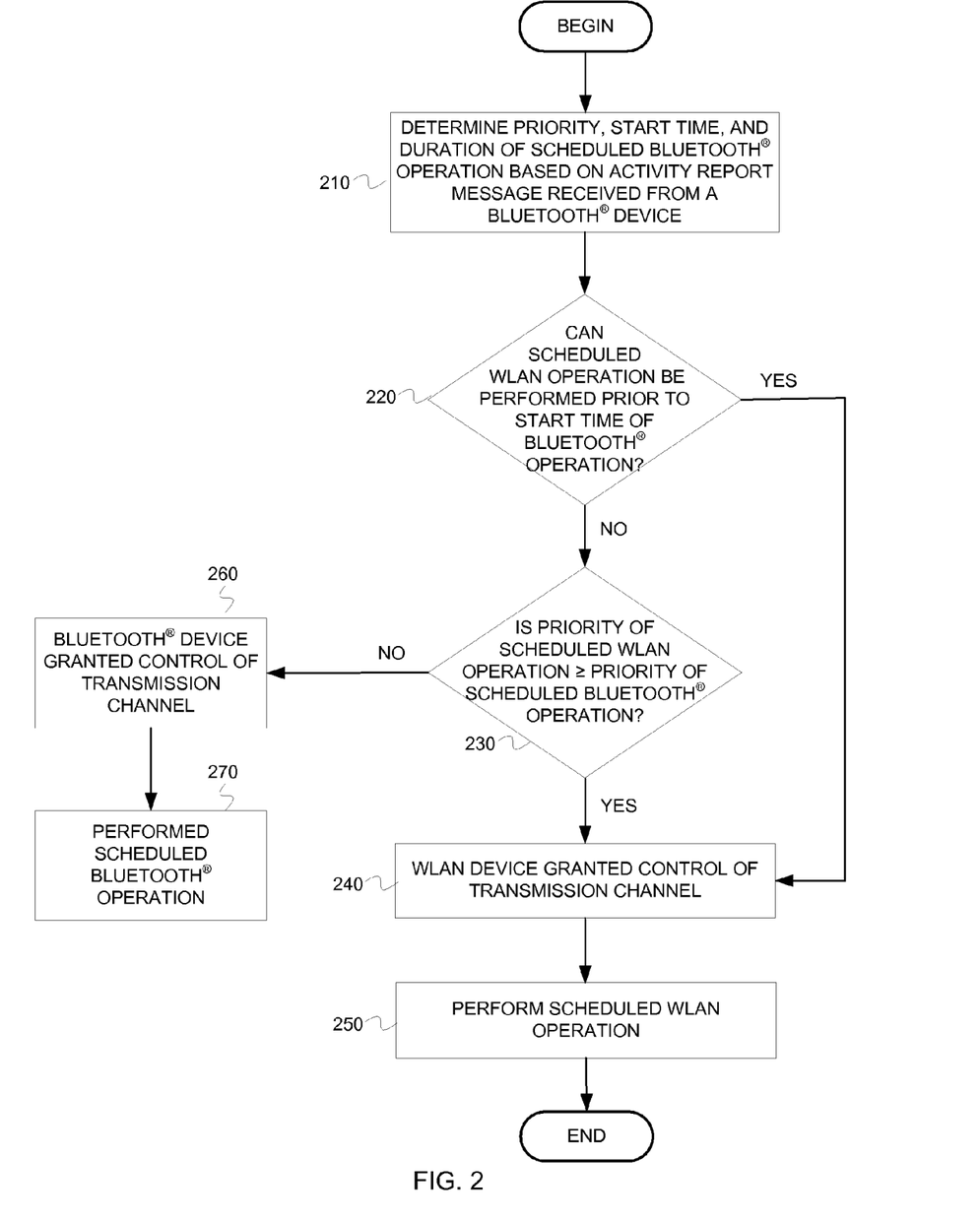
FIG. 2 depicts an example flow diagram of a method for arbitrating between performing operations associated with the WLAN device and performing operations associated with the Bluetooth® device.

FIG. 2 depicts an example flow diagram of a method for arbitrating between performing operations associated with the WLAN device 110 and performing operations associated with the Bluetooth® device 120. At block 210, a priority, start time, and duration of a scheduled operation associated with the Bluetooth® device 120 is determined based, at least in part, on an activity report message received from the Bluetooth® device 120 via a data I/O line. In one example, the arbitration unit 150 of the WLAN device receives the activity report message from the Bluetooth® device 120 and determines the priority, start time, and duration of the scheduled Bluetooth® operation based, at least in part, on data included within the message.

In one implementation, in order to generate the activity report message, the arbitration unit 160 of the Bluetooth® device 120 identifies a scheduled Bluetooth® operation and determines the priority, start time, and duration associated with the scheduled operation. In one example, the priority of the scheduled Bluetooth® operation may be determined from a lookup table that maps each type of Bluetooth® traffic to a priority weight. For instance, a range of priority weights 0-7 may be used, where a priority weight of 0 is assigned to the lowest priority traffic and a priority weight of 7 is assigned to the highest priority traffic. In one example, link polling transmissions to prevent losing a link or to recover a lost link may be considered critical traffic and therefore may be assigned the highest priority weight, e.g., a priority weight 7. Also, in this example, synchronous connection-oriented (SCO) traffic may be assigned a priority weight 5, and channel assessment transmissions may be assigned a priority weight 3. In some implementations, a similar priority scheme may be used to determine the priority of the different types of WLAN traffic, e.g., a priority weight of 7 may be assigned for transmissions related to link stability. It is noted, however, that in other implementations the priority of Bluetooth® and/or WLAN traffic may be determined by other methods, e.g., the priority may be predetermined by the Bluetooth® or WLAN scheduling engine or other processing engine. In one embodiment, the priority information may be encoded within the activity report message using a plurality of bits, e.g., three or four bits.

The start time information included within the activity report message may indicate the start time of the scheduled Bluetooth® operation. In one example, the start time information may be an encoded time value (e.g., measured in µs) that indicates the amount of time from the falling edge of the clock signal associated with the activity report message to the start of the scheduled Bluetooth® operation. In one implementation, the arbitration unit 150 of the WLAN device 110 may track the amount of time that has expired from the falling edge of the clock signal associated with the activity report message and compare it to the start time value to determine how much time remains until the start of the scheduled Bluetooth® operation. The duration information included within the activity report message may indicate the duration of the scheduled Bluetooth® operation, which is typically known ahead of time by the Bluetooth® device 120.

At block 220, it is determined whether a scheduled data transmission operation associated with the WLAN device 110 can be performed (i.e., executed and completed) prior to the start time of the scheduled Bluetooth® data transmission operation based, at least in part, on a transaction time associated with the scheduled WLAN operation. As described above, in one implementation, the arbitration unit 150 of the WLAN device 110 may track the amount of time that passes by from the falling edge of the clock signal associated with the activity report message and compare it to the start time value to determine how much time remains until the start of the scheduled Bluetooth® operation. The arbitration unit 150 may then compare the transaction time associated with the scheduled WLAN operation to the amount of time remaining until the start of the scheduled Bluetooth® operation to determine whether the scheduled WLAN operation can be performed prior to the start of the scheduled Bluetooth® operation.

Figure 3A:
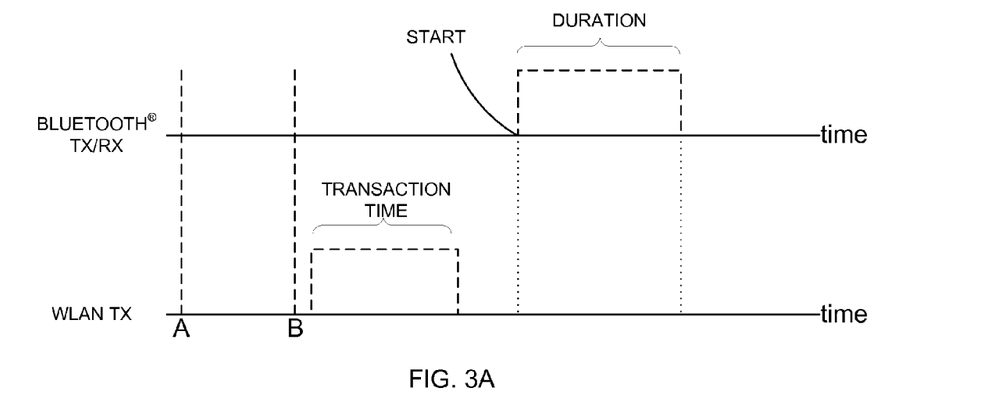
FIG. 3A depicts an example timing diagram showing when a scheduled WLAN operation can be performed prior to the start of a scheduled Bluetooth® operation.
Figure 3B:
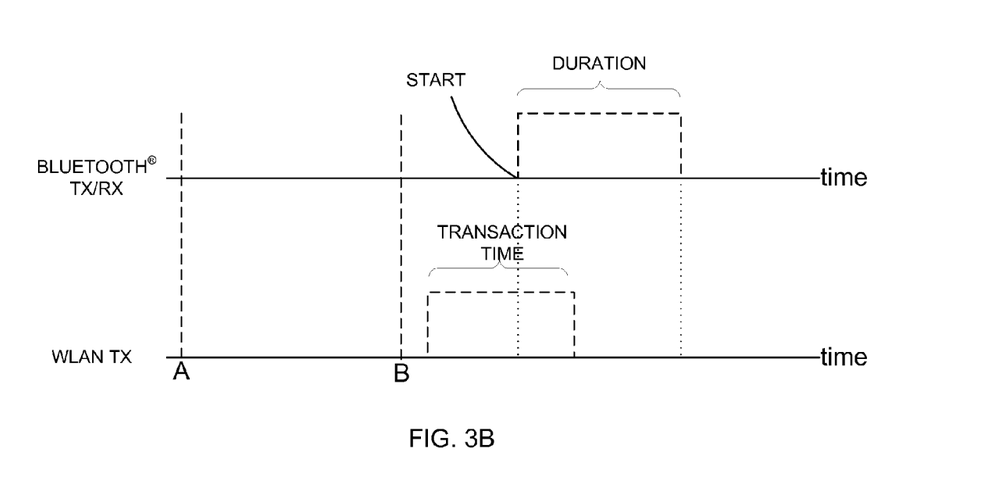
FIG. 3B depicts an example timing diagram showing when scheduled WLAN operation cannot be performed prior to the start of a scheduled Bluetooth® operation.

FIG. 3A depicts an example timing diagram showing when a scheduled WLAN operation can be performed prior to the start of the scheduled Bluetooth® operation. The timing diagram shows a point A indicating the point in time corresponding to the falling edge of the clock signal associated with the activity report message, and a point B indicating the point in time when the scheduled WLAN device is detected by the arbitration unit 150. After point B, the arbitration unit 150 can determine the transaction time associated with the scheduled WLAN operation and then determine whether the scheduled WLAN operation can be performed (i.e., executed and completed) prior to the start of the scheduled Bluetooth® operation. In the example shown in FIG. 3A, the arbitration unit 150 will determine that the scheduled WLAN operation can be completed prior to the start of the scheduled Bluetooth® operation. FIG. 3B depicts an example timing diagram showing when scheduled WLAN operation cannot be performed prior to the start of the scheduled Bluetooth® operation. In some cases, the amount of time between the reception of the activity report message and the start of the scheduled Bluetooth® operation may be relatively short, the transaction time of the scheduled WLAN operation may be relatively long, and/or the point in time when the scheduled WLAN operation is detected may be too close to the start time of the scheduled Bluetooth® operation. In the example shown in FIG. 3B, the arbitration unit 150 will determine that the scheduled WLAN operation cannot be completed prior to the start of the scheduled Bluetooth® operation.

Returning to FIG. 2, if the scheduled WLAN operation can be performed prior to the start time of the scheduled Bluetooth® operation, at block 240, the WLAN device 110 is granted control of the transmission channel. For example, the arbitration unit 150 may provide a control signal to the processing unit 130 and/or the transceiver unit 135 to indicate that the WLAN device 110 has been granted control of the transmission channel. It is noted, however, that in other implementations the arbitration unit 150 may also store a value in a register of the WLAN device 110 to indicate control of the transmission channel has been granted. At block 250, the scheduled WLAN data transmission operation is performed. For example, the transceiver unit 135 may perform the operation by transmitting the WLAN data via an antenna to a receiving entity (e.g., access point 194).

If the scheduled WLAN operation cannot be performed prior to the start time of the scheduled Bluetooth® operation, at block 230, the priorities of the scheduled operations (e.g., the assigned priority weights) are compared to determine whether the priority associated with the scheduled WLAN operation is higher than the priority associated with the scheduled Bluetooth® operation. If the priority of the scheduled WLAN operation is higher than or the same as the priority associated with the scheduled Bluetooth® operation, at block 240, the WLAN device 110 is granted control of the transmission channel. Furthermore, in this example, the arbitration unit 150 may provide an activity denied message to the Bluetooth® device 120 to indicate that control of the transmission channel has been denied due to priority arbitration and therefore the scheduled Bluetooth® operation will be delayed or cancelled. At block 250, the scheduled WLAN data transmission operation is performed. It is noted, however, that in some implementations, if the priority of the scheduled WLAN operation is the same as the priority associated with the scheduled Bluetooth® operation, the Bluetooth® device 120 may be granted control of the transmission channel.

If the priority of the scheduled WLAN operation is lower than the priority associated with the scheduled Bluetooth® operation, at block 260, the Bluetooth® device 120 is granted control of the transmission channel. In this example, the arbitration unit 150 may provide a control signal to the processing unit 130 and/or the transceiver unit 135 to indicate that the WLAN device 110 has been denied control of the transmission channel and therefore to delay performing the scheduled WLAN data transmission operation. It is noted that in this example the arbitration unit 150 may not send a message (e.g., the activity denied message) to the Bluetooth® device 120. If the Bluetooth® device 120 does not receive a message, then the Bluetooth® device 120 is allowed to perform the scheduled operation. It is noted, however, that in other embodiments the arbitration unit 150 may provide an activity grated message to the Bluetooth® device 120 to indicate that control of the transmission channel has been granted to the Bluetooth® device 120. In this example, instead of initiating the WLAN operation and suspending the WLAN operation due to the higher priority Bluetooth® traffic, power is saved by delaying performance of the lower priority WLAN operation until it can be completed.

In various embodiments, the arbitration unit 160 of the Bluetooth device 120 generates and sends the activity report message immediately after a scheduled Bluetooth® operation is detected by the arbitration unit 160. This may provide the WLAN device 110 adequate time to perform scheduled WLAN operations during idle periods of the Bluetooth® device 120, especially if the priority of the scheduled Bluetooth® operations is higher than the priority of the scheduled WLAN operations. In some implementations, an activity report message is sent before each scheduled Bluetooth® transmission, i.e., both Bluetooth® transmit and receive operations. In other implementations, e.g., for deterministic Bluetooth® traffic, such as SCO and eSCO traffic, a single activity report message can be sent to inform the WLAN device 110 about multiple Bluetooth® operations. By providing the start time and duration information (in addition to the priority information), the WLAN device 110 can calculate the start time for the various Bluetooth® operations. The arbitration unit 150 of the WLAN device 110 can still check whether WLAN operations can be performed during Bluetooth® idle periods and also compare the priority of the scheduled traffic. If a scheduled WLAN operation has a higher priority than a scheduled Bluetooth® operation, then the multiple Bluetooth® operations may be interrupted, and a new activity report message can be sent when the Bluetooth® device 120 once again gains control of the transmission channel.

Figure 4:
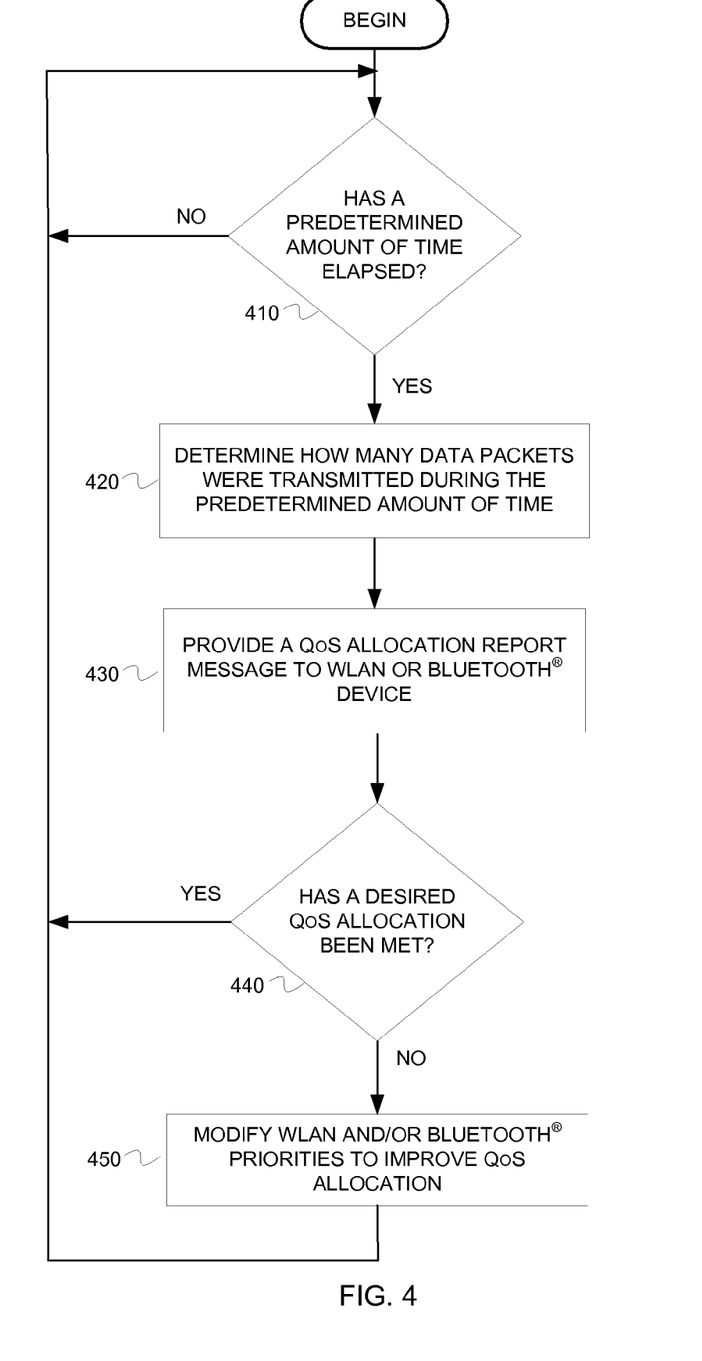
FIG. 4 depicts an example flow diagram of a method for processing Quality of Service (QoS) allocation information for improving coexistence between the WLAN and Bluetooth® devices.

FIG. 4 depicts an example flow diagram of a method for processing Quality of Service (QoS) allocation information. In one embodiment, the WLAN device 110 and the Bluetooth® device 120 exchange QoS allocation report messages to determine whether a desired amount of time is being allotted for transmission of WLAN traffic and a desired amount of time is being allotted for transmission of Bluetooth® traffic. The WLAN device 110 sends QoS allocation report messages to the Bluetooth® device 120, and the Bluetooth® device 120 sends QoS allocation report messages to the WLAN device 110, via the corresponding data I/O lines, to determine whether a desired time allocation quota is being maintained between WLAN and Bluetooth® traffic. In other words, the QoS information may help maintain a desired balance between WLAN and Bluetooth® traffic, as will be described further below.

In one implementation, both the WLAN device 110 and the Bluetooth device 120 implement the QoS processes illustrated in FIG. 4. It is noted that the WLAN and Bluetooth® devices may perform the QoS process concurrently or at different times. At block 410, it is determined whether a predetermined amount of time has elapsed since the QoS process was initiated or since the last QoS allocation report message was sent. If the predetermined amount of time has not elapsed, then the process loops back to the beginning and restarts. If the predetermined amount of time has elapsed, at block 420, it is determined how many data packets where transmitted during the predetermined amount of time. For example, the arbitration unit 150 of the WLAN device 110 determines how many data packets were transmitted in the WLAN data transmission operation performed during the predetermined amount of time, and the arbitration unit 160 of the Bluetooth® device 120 determines how many data packets were transmitted in Bluetooth® data transmission operation performed during the predetermined amount of time. It is noted that the predetermined amount of time may be programmable.

At block 430, a QoS allocation report is provided to the WLAN device 110 or the Bluetooth® device 120 including QoS allocation information. For example, the arbitration unit 150 of the WLAN device 110 provides the arbitration unit 160 of the Bluetooth® device 120 QoS allocation information based on how many WLAN data packets were transmitted during the predetermined amount of time, and the arbitration unit 160 of the Bluetooth® device 120 provides the arbitration unit 150 of the WLAN device 110 QoS allocation information based on how many Bluetooth® data packets were transmitted during the predetermined amount of time. In one specific implementation, based on the detected number of packets that were transmitted during the predetermined amount of time, the arbitration unit 150 calculates a QoS allocation percentage value indicating the percentage of the predetermined amount of time that was allocated to the transmission of WLAN traffic, and the arbitration unit 160 calculates a QoS allocation percentage value indicating the percentage of the predetermined amount of time that was allocated to the transmission of Bluetooth® traffic. In this implementation, the QoS allocation information included within the QoS allocation report messages includes at least the calculated QoS allocation percentage value. It is noted, however, that in other implementations the QoS allocation report messages may include additional information or different information, e.g., the QoS allocation report messages may instead include the number of transmitted data packets and the receiving device may calculate the QoS allocation percentage value.

At block 440, it is determined whether a desired QoS allocation has been met during the predetermined amount of time. In one implementation, the desired QoS allocation indicates the desired QoS allocation percentage value for WLAN traffic and for Bluetooth® traffic. For example, a 50/50 desired QoS allocation may specify a 50% QoS allocation percentage value for WLAN traffic and a 50% QoS allocation percentage value for Bluetooth® traffic. In another example, a 60/40 desired QoS allocation may specify a 60% QoS allocation percentage value for WLAN traffic and a 40% QoS allocation percentage value for Bluetooth® traffic. It is noted that the desired QoS allocation may be programmable. If the desired QoS allocation has been met, the process loops back to the beginning and restarts. In one embodiment, the desired QoS allocation is considered to have been met if the actual percentage values are 3% higher or lower than the desired values. For example, if the desired QoS allocation is 50/50 and the actual QoS allocation is 53/47, then the desired QoS allocation is considered to have been met. It is noted, however, that in other embodiments, the desired QoS allocation is considered to have been met if the actual percentage values are a programmable percentage higher or lower than the desired values, e.g., 1% or 5%.

If the desired QoS allocation has not been met, at block 450, the WLAN and/or Bluetooth® priorities are modified to change the actual QoS allocation to be more in line with the desired QoS allocation. For example, if the desired QoS allocation is 50/50 and the actual QoS allocation is 40/60, this indicates that the Bluetooth® throughput needs to be reduced and the WLAN throughput needs to be increased to improve the QoS allocation. In this example, the arbitration unit 150 may modify the priority associated with WLAN data traffic to help ensure that more WLAN operations are performed. In other words, WLAN operations may be assigned higher priorities than Bluetooth® operations so that more WLAN operations are performed and the QoS allocation percentage value associated with the WLAN traffic is increased (and the QoS allocation percentage value associated with the Bluetooth® traffic is decreased). In some cases, the arbitration unit 160 may similarly modify the priority associated with Bluetooth data traffic. It is noted that in other embodiments instead of or in addition to determining whether a desired QoS allocation has been met during the predetermined amount of time, it is determined whether a desired QoS allocation goal has been met for the time period since the QoS process was initiated.

Figure 5:
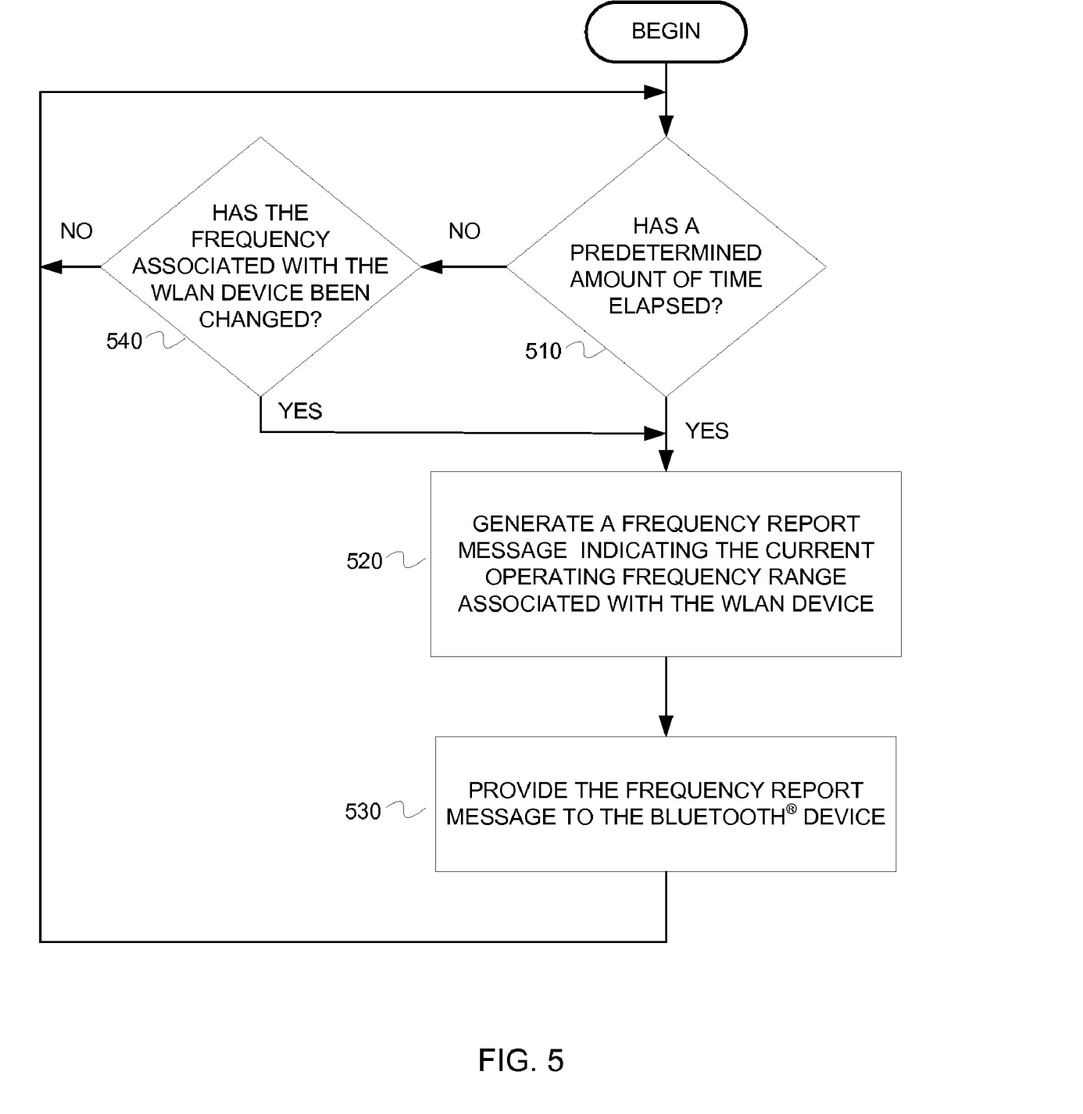
FIG. 5 depicts an example flow diagram of a method for providing a frequency report message to a Bluetooth® device for improving coexistence between the WLAN and Bluetooth® devices.

FIG. 5 depicts an example flow diagram of a method for providing a frequency report message to a Bluetooth® device for improving coexistence between the WLAN and Bluetooth® devices. In one embodiment, the WLAN device 110 sends a frequency report messages to the Bluetooth® device 120 to indicate a frequency range to avoid during Bluetooth® operations. The frequency report messages may be sent directly from the WLAN device 110 to the Bluetooth® device 120 via the data I/O line.

At block 510, it is determined whether a predetermined amount of time has elapsed since the frequency reporting process was initiated or since the last frequency report message was sent. If the predetermined amount of time has elapsed, at block 520, a frequency report message is generated indicating the current operating frequency range associated with the WLAN device 110. For example, the arbitration unit 150 may generate a frequency report message indicating that the WLAN device is operating within the frequency band from 2402 MHz to 2424 MHz. It is noted that the predetermined amount of time may be programmable. At block 530, the generated frequency report message is provided to the Bluetooth® device 120.

If the predetermined amount of time has not elapsed, at block 540, it is determined whether the operating frequency associated WLAN device 110 has been changed. If the operating frequency associated with the WLAN device 110 has not been changed, then the process loops back to the beginning and restarts. If the operating frequency has been changed, at block 520, a frequency report message is generated indicating the current operating frequency range associated with the WLAN device 110. Then, at block 530, the generated frequency report message is provided to the Bluetooth® device 120.

Figure 6:
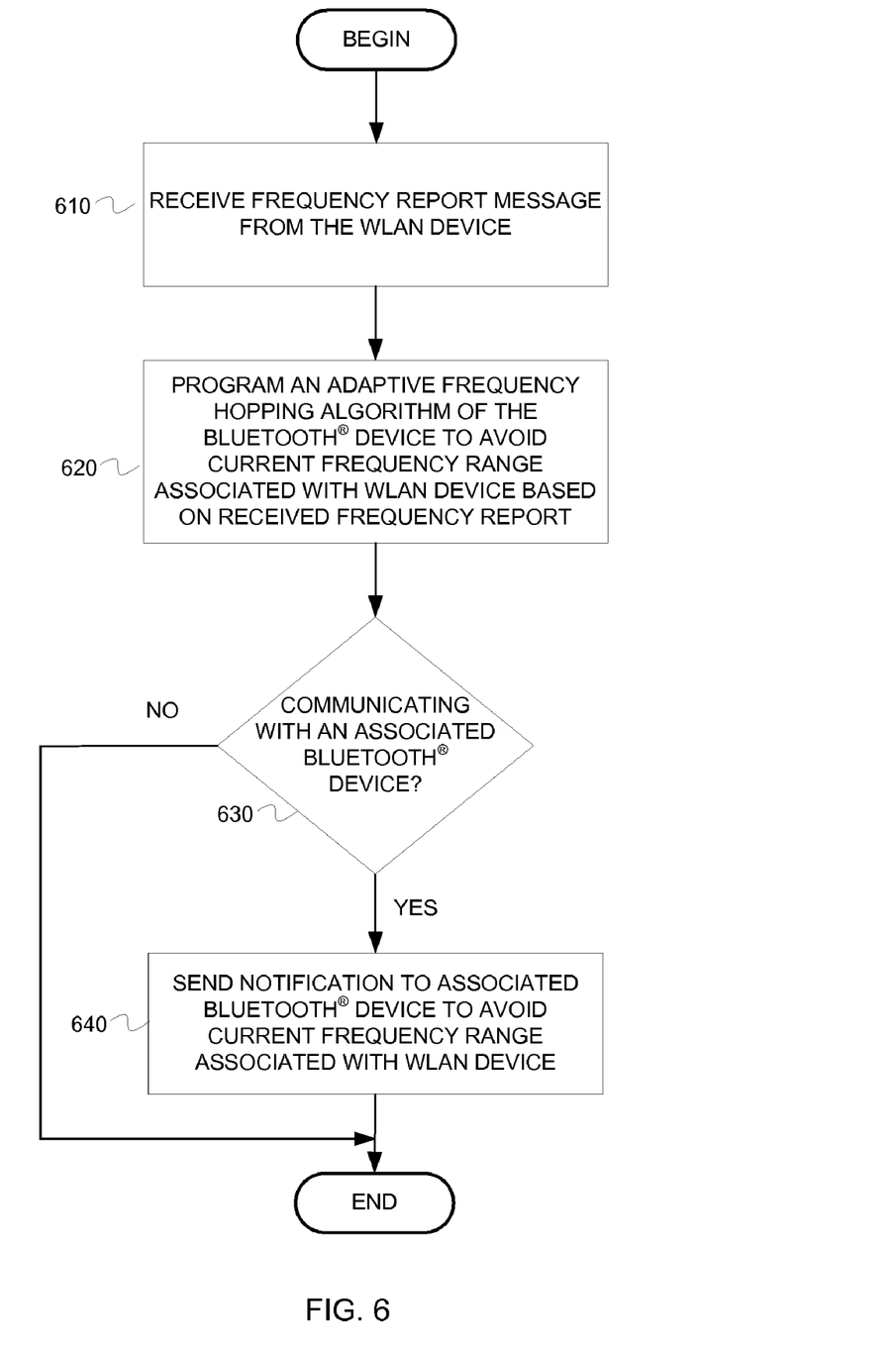
FIG. 6 depicts an example flow diagram of a method for processing a frequency report message for improving coexistence between the WLAN and Bluetooth® devices.

FIG. 6 depicts an example flow diagram of a method for processing a frequency report message for improving coexistence between the WLAN and Bluetooth® devices. At block 610, a frequency report message is received from the WLAN device 110. For example, the arbitration unit 160 may receive a frequency report message from the arbitration unit 150. At block 620, an adaptive frequency hopping (AFH) algorithm implemented by the Bluetooth® device 120 is programmed to avoid the current frequency range associated with the WLAN device 110 based on the received frequency report message. For example, if the frequency report message indicates that the WLAN device 110 is operating in the frequency band from 2402 MHz to 2424 MHz, the arbitration unit 160 programs an AFH algorithm of the Bluetooth® device 120 to avoid the frequencies within the specified frequency band.

At block 630, it is determined whether the Bluetooth device 120 is communicating with an associated Bluetooth® device. For example, the arbitration unit 160 determines whether the Bluetooth® device 120 is communicating with an associated Bluetooth® headset (e.g., Bluetooth® headset 196). Since the associated Bluetooth® device may be transmitting data to the Bluetooth® device 120, at block 640, a notification may be sent to the associated Bluetooth® device to avoid the current frequency range associated with the WLAN device 110. For instance, in the example described above, the arbitration unit 160 may cause the transceiver unit 145 of the Bluetooth® device 120 to send a notification signal to the Bluetooth® headset 196 to avoid the frequencies within frequency band from 2402 MHz to 2424 MHz.

It should be understood that the depicted flowcharts are examples meant to aid in understanding embodiments and should not be used to limit embodiments or limit scope of the claims. Embodiments may perform additional operations, fewer operations, operations in a different order, operations in parallel, and some operations differently. For instance, in FIG. 2, the operations represented by block 230 may be performed prior to or in parallel to the operations represented by block 220. In FIG. 5, operations represented by block 540 may be performed in parallel to or separate from to operations represented by block 510. Furthermore, the coexistence techniques described above may be implemented within other types of wireless devices, e.g., a WiMAX device.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, machine-readable signal medium embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
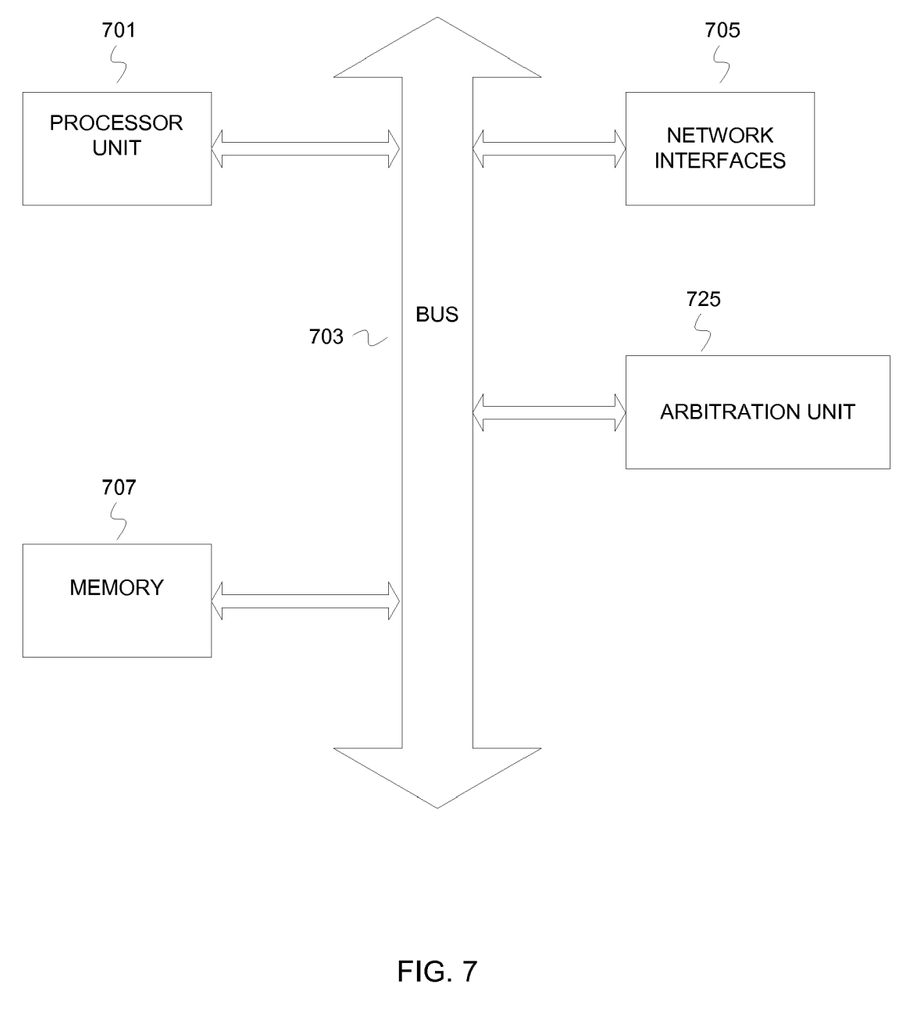
FIG. 7 depicts an example wireless device.

FIG. 7 depicts an example wireless device. In one implementation, the wireless device may be a WLAN device. The WLAN device includes a processor unit 701 (possibly including multiple processors, multiple cores, multiple nodes, and/or implementing multi-threading, etc.). The WLAN device includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The WLAN device also includes a bus 703 (e.g., PCI, ISA, PCI-Express, HyperTransport®, InfiniBand®, NuBus, etc.), and network interfaces 705 that include at least one wireless network interface (e.g., a WLAN interface, a Bluetooth® interface, a WiMAX interface, a ZigBee® interface, a Wireless USB interface, etc.). The WLAN device also includes an arbitration unit 725 that implements the functionalities described above with reference to arbitration unit 150 of FIGS. 1-6. Any one of the above described functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7 (e.g., additional network interfaces, peripheral devices, etc.). The processor unit 701 and the network interfaces 705 are coupled to the bus 703. Although illustrated as being coupled to the bus 703, the memory 707 may be coupled to the processor unit 701. In another implementation, the example wireless device shown in FIG. 7 may be a Bluetooth® device that comprises the components described above with reference to FIGS. 1-7 and which includes an arbitration unit 725 that implements the functionalities described above with reference to arbitration unit 160 of FIGS. 1-6.

While the embodiments are described with reference to various implementations and exploitations, it will be understood that these embodiments are illustrative and that the scope of the inventive subject matter is not limited to them. In general, the coexistence techniques as described herein may be implemented with facilities consistent with any hardware system or systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for arbitrating between performing operations associated with a first network device and performing operations associated with a second network device coupled to the first network device, the method comprising:

determining a start time of a scheduled operation associated with a second network device based, at least in part, on an activity report message received at a first network device from the second network device;

determining whether a scheduled operation associated with the first network device can be performed prior to the start time of the scheduled operation associated with the second network device based, at least in part, on a transaction time associated with the scheduled operation associated with the first network device;

performing the scheduled operation associated with the first network device if the scheduled operation associated with the first network device can be performed prior to the start time of the scheduled operation associated with the second network device;

determining a quality of service (QoS) allocation percentage value associated with the first network device based on performing one or more scheduled operations during a predetermined time period;

providing a QoS allocation report message from the first network device to the second network device indicating the QoS allocation percentage value associated with the first network device; and receiving, at the first network device, a QoS allocation report message from the second network device indicating a QoS allocation percentage value associated with the second network device based on performing one or more scheduled operations during the predetermined time period.

2. The method of claim 1, wherein the first network device is a wireless local area network (WLAN) device and the second network device is a Bluetooth® device.

3. The method of claim 1, further comprising:

determining a priority of the scheduled operation associated with the second network device based on the activity report message received from the second network device;

if the scheduled operation associated with the first network device cannot be performed prior to the start time of the scheduled operation associated with the second network device, determining whether a priority of the scheduled operation associated with the first network device is higher than or the same as the priority of the scheduled operation associated with the second network device; and performing the scheduled operation associated with the first network device if the priority of the scheduled operation associated with the first network device is higher than or the same as the priority of the scheduled operation associated with the second network device.

4. The method of claim 3, further comprising causing the scheduled operation associated with the second network device to be performed if the priority of the scheduled operation associated with the first network device is lower than the priority of the scheduled operation associated with the second network device.

5. The method of claim 1, further comprising providing a frequency report message to the second network device indicating a restricted transmission frequency range to prevent the second network device from performing data transmission operations within the restricted transmission frequency range.

6. The method of claim 1, wherein said determining the QoS allocation percentage value associated with the first network device based on performing one or more scheduled operations during the predetermined time period comprises determining, at the first network device, the QoS allocation percentage value associated with the first network device based, at least in part, on a number of packets, associated with the one or more scheduled operations, transmitted by the first network device during the predetermined time period.

7. The method of claim 1, further comprising determining whether a desired QoS allocation associated with the first network device and the second network device has been met based, at least in part, on the QoS allocation percentage value associated with the second network device and the QoS allocation percentage value associated with the first network device.

8. The method of claim 7, further comprising, if the desired QoS allocation has not been met, modifying the priorities associated with a plurality of future operations associated with the first network device or operations associated with the second network device to improve the QoS allocation.

9. A wireless local area network (WLAN) device comprising:
a transceiver unit operable to perform WLAN data operations; and
an arbitration unit operable to determine a start time of a scheduled data operation associated with a Bluetooth® device coupled to the WLAN device based, at least in part, on an activity report message received from the Bluetooth® device;
wherein the arbitration unit is operable to determine whether a scheduled WLAN data operation can be performed prior to the start time of the scheduled data operation associated with the Bluetooth® device based, at least in part, on a transaction time associated with the scheduled WLAN data operation;
wherein the transceiver unit is operable to perform the scheduled WLAN data operation if the scheduled WLAN data operation can be performed prior to the start time of the scheduled data operation associated with the Bluetooth® device;
wherein the arbitration unit is further operable to,
determine a quality of service (QoS) allocation percentage value associated with the WLAN device based on the transceiver unit performing one or more scheduled WLAN data operations during a predetermined time period;
provide a QoS allocation report message from the WLAN device to the Bluetooth® device indicating the QoS allocation percentage value associated with the WLAN device; and
receive a QoS allocation report message from the Bluetooth® device indicating a QoS allocation percentage value associated with the Bluetooth® device based on the Bluetooth® device performing one or more scheduled Bluetooth® operations during the predetermined time period.

10. The WLAN device of claim 9, wherein the arbitration unit is operable to determine a priority of the scheduled data operation associated with the Bluetooth® device based on the activity report message received from the Bluetooth® device, wherein, if the scheduled WLAN data operation cannot be performed prior to the start time of the scheduled data operation associated with the Bluetooth® device, the arbitration unit is operable to determine whether a priority of the scheduled WLAN data operation is higher than or the same as the priority of the scheduled data operation associated with the Bluetooth® device, and wherein the transceiver unit is operable to perform the scheduled WLAN data operation if the priority of the scheduled WLAN data operation is higher than or the same as the priority of the scheduled data operation associated with the Bluetooth® device.

11. The WLAN device of claim 10, wherein the arbitration unit is operable to cause the scheduled data operation associated with the Bluetooth® device to be performed if the priority of the scheduled WLAN data operation is lower than the priority of the scheduled data operation associated with the Bluetooth® device.

12. An apparatus comprising:
a first network device comprising an arbitration unit, a transceiver unit, a legacy arbitration unit, and a multiplexer; and
a second network device coupled to the first network device, wherein the second network device comprises an arbitration unit;
wherein the multiplexer is coupled between the first network device arbitration unit and the second network device, and between the legacy arbitration unit and the second network device, wherein the multiplexer is operable to switch in the first network device arbitration unit or the legacy arbitration unit for communications with the second network device;
wherein the second network device arbitration unit is operable to provide an activity report message to the first network device, wherein the activity report message includes start time data associated with a scheduled second network device data transmission operation;
wherein the first network device arbitration unit is operable to determine a start time of the scheduled second network device data transmission operation based, at least in part, on the activity report message;
wherein, if a scheduled first network device data transmission operation can be performed prior to the start time of the scheduled second network device data transmission operation, the first network device transceiver unit is operable to perform the scheduled first network device data transmission operation.

13. The apparatus of claim 12, wherein the first network device is a wireless local area network (WLAN) device and the second network device is a Bluetooth® device.

14. The apparatus of claim 12, wherein the first network device arbitration unit is operable to determine whether the scheduled first network device data transmission operation can be performed prior to the start time of the scheduled second network device data transmission operation based, at least in part, on a transaction time associated with the scheduled first network device data transmission.

15. The apparatus of claim 12, wherein the first network device arbitration unit is operable to determine a priority of the scheduled second network device data transmission operation based on the activity report message received from the second network device, wherein, if the scheduled first network device data transmission operation cannot be performed prior to the start time of the scheduled second network device data transmission operation, the first network device arbitration unit is operable to determine whether a priority of the scheduled first network device data transmission operation is higher than or the same as the priority of the scheduled second network device data transmission operation, wherein the first network device transceiver unit is operable to perform the scheduled first network device data transmission operation if the priority of the scheduled first network device data transmission operation is higher than or the same as the priority of the scheduled second network device data transmission operation.

16. The apparatus device of claim 15, wherein the first network device arbitration unit is operable to cause the scheduled second network device data transmission operation to be performed by the second network device if the priority of the scheduled first network device data transmission operation is lower than the priority of the scheduled second network device data transmission operation.

17. The apparatus of claim 12, wherein the apparatus comprises one or more integrated circuits comprising the first network device and the second network device.

18. The apparatus of claim 12, wherein the second network device further comprises a multiplexer and a legacy arbitration unit, wherein the multiplexer is coupled between the second network device arbitration unit and the first network device and between the legacy arbitration unit and the first network device, wherein the multiplexer is operable to switch in the second network device arbitration unit or the legacy arbitration unit for communications with the first network device.

19. The apparatus of claim 12, wherein the second network device is operable to generate the activity report message immediately after detecting the scheduled second network device operation.

20. The apparatus of claim 12, wherein the second network device arbitration unit is operable to determine a start time, duration, and priority associated with the scheduled second network device data transmission operation and generate the activity report message based on the determined start time, duration, and priority.

21. The apparatus of claim 12, wherein the first network device arbitration unit is operable to provide a frequency report message to the second network device arbitration unit indicating a restricted transmission frequency range to prevent the second network device from performing data transmission operations within the restricted transmission frequency range.

22. The apparatus of claim 12, wherein:
the first network device arbitration unit is operable to,
 determine a quality of service (QoS) allocation percentage value associated with the first network device based on the first network device arbitration unit performing one or more scheduled operations during a predetermined time period;
 provide a QoS allocation report message to the second network device arbitration unit indicating the QoS allocation percentage value associated with the first network device; and
the second network device arbitration unit is operable to,
 determine QoS allocation percentage value associated with the second network device based on the second network device arbitration unit performing one or more scheduled operations during the predetermined time period; and
 provide a QoS allocation report message to the first network device arbitration unit indicating the QoS allocation percentage value associated with the second network device.

23. The apparatus of claim 22, wherein the first network device arbitration unit and the second network device arbitration unit are operable to determine whether a desired QoS allocation associated with the first network device and the second network device has been met based, at least in part, on the QoS allocation percentage value associated with the second network device and the QoS allocation percentage value associated with the first network device.

24. The apparatus of claim 23, wherein, if the desired QoS allocation for the first network device has not been met, the first network device arbitration unit is operable to modify the priorities associated with a plurality of future first network device operations to improve the QoS allocation, and if the desired QoS allocation for the second network device has not been met, the second network device arbitration unit is operable to modify the priorities associated with a plurality of future second network device operations to improve the QoS allocation.

25. One or more machine-readable storage media having instructions stored therein a program product, which when executed by a set of one or more processors causes the one or more processors to perform operations that comprise:
 determining a start time of a scheduled operation associated with a second network device based, at least in part, on an activity report message received at a first network device from the second network device;
 determining whether a scheduled operation associated with the first network device can be performed prior to the start time of the scheduled operation associated with the second network device based, at least in part, on a transaction time associated with the scheduled operation associated with the first network device;
 performing the scheduled operation associated with the first network device if the scheduled operation associated with the first network device can be performed prior to the start time of the scheduled operation associated with the second network device;
 determining a quality of service (QoS) allocation percentage value associated with the first network device based on performing one or more scheduled operations during a predetermined time period;
 providing a QoS allocation report message from the first network device to the second network device indicating the QoS allocation percentage value associated with the first network device; and
 receiving, at the first network device, a QoS allocation report message from the second network device indicating a QoS allocation percentage value associated with the second network device based on performing one or more scheduled operations during the predetermined time period.

26. The machine-readable storage media of claim 25, wherein the first network device is a wireless local area network (WLAN) device and the second network device is a Bluetooth® device.

27. The machine-readable storage media of claim 26, wherein the operations further comprise causing the scheduled operation associated with the second network device to be performed if the priority of the scheduled operation associated with the first network device is lower than the priority of the scheduled operation associated with the second network device.

28. The machine-readable storage media of claim 25, wherein the operations further comprise:

determining a priority of the scheduled operation associated with the second network device based on the activity report message received from the second network device;

if the scheduled operation associated with the first network device cannot be performed prior to the start time of the scheduled operation associated with the second network device, determining whether a priority of the scheduled operation associated with the first network device is higher than or the same as the priority of the scheduled operation associated with the second network device; and performing the scheduled operation associated with the first network device if the priority of the scheduled operation associated with the first network device is higher than or the same as the priority of the scheduled operation associated with the second network device.

* * * * *